United States Patent
Dabak et al.

(10) Patent No.: US 11,816,218 B2
(45) Date of Patent: Nov. 14, 2023

(54) PROTECTING OPERATING SYSTEM KERNEL OBJECTS USING A HYPERVISOR

(71) Applicant: VMWARE, INC., Pato Alto, CA (US)

(72) Inventors: Prasad Sharad Dabak, Pune (IN); Leena Shuklendu Soman, Pune (IN)

(73) Assignee: VMWARE, INC., Palo Alto, CA (US)

( * ) Notice: Subject to any disclaimer, the term of this patent is extended or adjusted under 35 U.S.C. 154(b) by 507 days.

(21) Appl. No.: 16/938,986

(22) Filed: Jul. 26, 2020

(65) Prior Publication Data
US 2021/0374242 A1 Dec. 2, 2021

(30) Foreign Application Priority Data
Jun. 1, 2020 (IN) .............................. 202041022992

(51) Int. Cl.
| | | |
|---|---|---|
| G06F 21/00 | (2013.01) | |
| G06F 21/56 | (2013.01) | |
| G06F 9/455 | (2018.01) | |
| G06F 21/55 | (2013.01) | |
| G06F 21/54 | (2013.01) | |

(52) U.S. Cl.
CPC ........ G06F 21/566 (2013.01); G06F 9/45545 (2013.01); G06F 9/45558 (2013.01); G06F 21/54 (2013.01); G06F 21/554 (2013.01); *G06F 2009/45583* (2013.01); *G06F 2009/45587* (2013.01); *G06F 2009/45591* (2013.01); *G06F 2221/034* (2013.01)

(58) Field of Classification Search
CPC .... G06F 9/45558; G06F 21/554; G06F 21/54; G06F 21/53; G06F 21/566; G06F 9/45545; G06F 2009/45587; G06F 2009/45591; G06F 2009/45583; G06F 2009/45575; G06F 2221/034
See application file for complete search history.

(56) References Cited

U.S. PATENT DOCUMENTS

| | | | |
|---|---|---|---|
| 10,620,985 | B2 | 4/2020 | Dabak et al. |
| 2017/0249263 | A1* | 8/2017 | Tsirkin .................. G06F 21/53 |
| 2018/0096162 | A1* | 4/2018 | Liu ..................... G06F 12/1009 |
| 2018/0267818 | A1 | 9/2018 | Dabak et al. |

* cited by examiner

Primary Examiner — Tri M Tran
(74) Attorney, Agent, or Firm — SU IP CONSULTING

(57) ABSTRACT

Example methods are provided to use a guest monitoring mode (GMM) module in a hypervisor to monitor for attempts to maliciously modify operating system (OS) kernel objects in a virtualized computing environment. A created OS kernel object is migrated to a memory space where the GMM module can detect an attempt to modify the OS kernel object. The GMM module uses reference information to determine whether the modification is authorized by trusted OS kernel code or is being attempted by malicious code.

21 Claims, 4 Drawing Sheets

PROTECTING OPERATING SYSTEM KERNEL OBJECTS USING A HYPERVISOR

RELATED APPLICATIONS

Benefit is claimed under 35 U.S.C. 119(a)-(d) to Foreign Application Serial No. 202041022992 filed in India entitled "PROTECTING OPERATING SYSTEM KERNEL OBJECTS USING A HYPERVISOR", on Jun. 1, 2020, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

A typical OS includes a kernel that is protected by some form of a security mechanism. For example, security approaches such as PatchGuard, Driver Signing, Device Guard etc. are available to protect against attempts by malicious code to modify the OS kernel of Microsoft Windows®. Such security approaches, when enabled, significantly reduce the scope of kernel rootkits or other malicious code, for instance by making it impossible or difficult for any arbitrary code (e.g., potentially malicious code) to run in the kernel unless the code is sign-verified by a secure kernel that runs in a separate and secure address space that is created by a hypervisor at a host, or unless the code is sign-verified in the guest.

However, despite the presence of such security mechanisms to protect the code itself in the OS kernel, OS kernel objects (e.g., data and/or data structures created or used by the kernel) are still vulnerable to attacks and other malicious modifications by malicious code (e.g., malware, viruses, rootkits, spyware, etc.). For instance, malicious code can leverage the vulnerabilities in a kernel and/or in a signed kernel driver in order to target OS kernel objects, such as by using a write-anything-anywhere primitive to alter the state of kernel data in a malicious manner. As one example, the malicious code can alter a process token object (e.g., alter the access rights or privileges specified for the processes run by the kernel) so as to provide undesirable access to the process to an unauthorized user. As another example, the malicious code can alter function pointers in OS kernel objects so as to point to return oriented programming (ROP) chains, by using gadgets from an existing sign-verified kernel code to perform such an attack.

DETAILED DESCRIPTION

Figure 1:
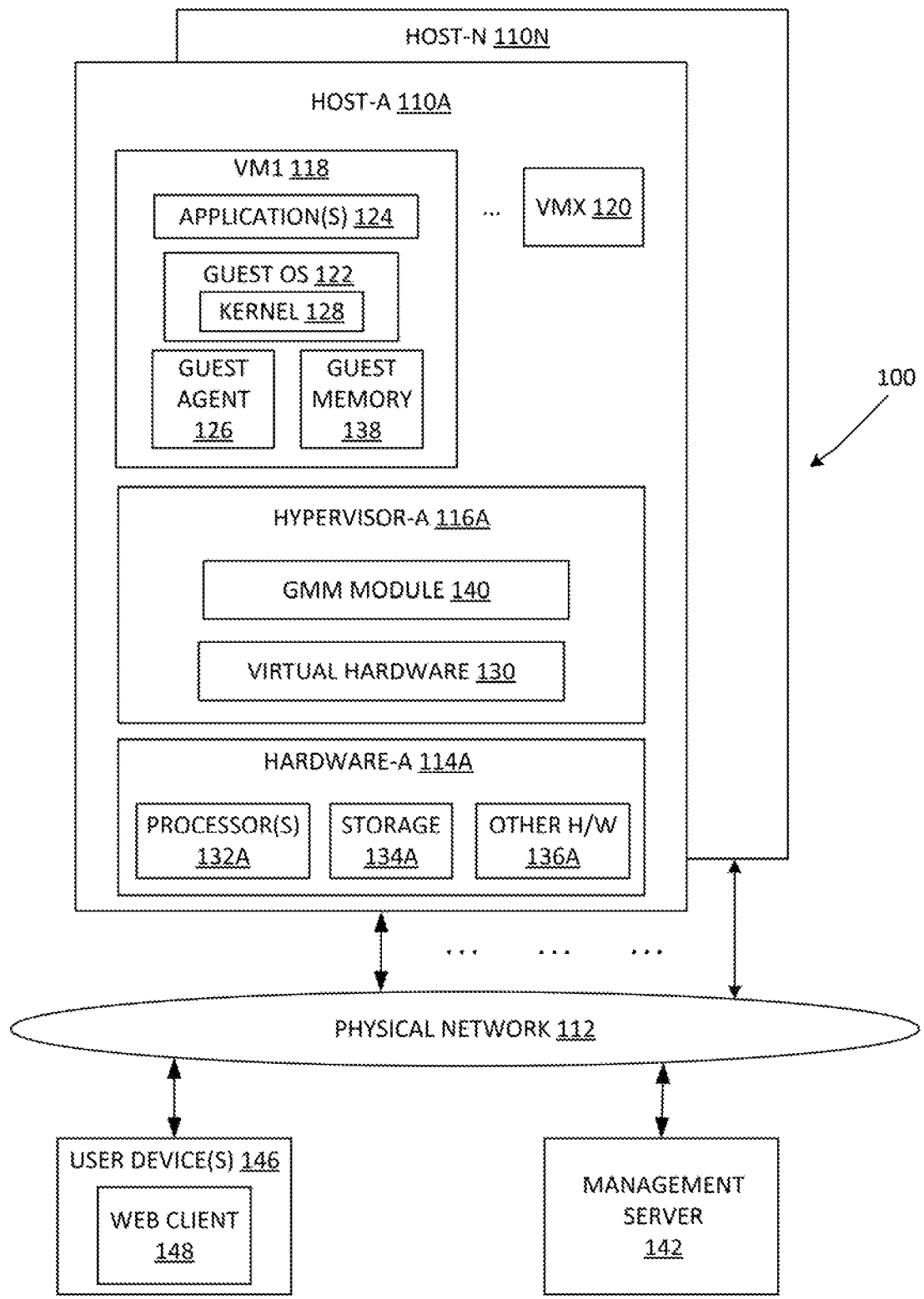
FIG. 1 is a schematic diagram illustrating an example virtualized computing environment that can implement a method to protect OS kernel objects.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses potential drawbacks in defense systems for virtualized computing environments described above that protect the kernel code of an operating system (OS) but leave the OS kernel objects (e.g., kernel data) potentially vulnerable to malicious code. According to one embodiment, a guest agent in a virtual machine (VM) pre-allocates a memory space where created OS kernel objects can be migrated to. A guest monitoring mode (GMM) module (at a hypervisor that supports the virtual machine) monitors the pre-allocated memory space for attempts to modify the OS kernel object. The GMM module detects a modification attempt by checking reference information to determine whether the modification attempt originated from trusted OS kernel code or from malicious code. Remedial action can be taken if the modification attempts is determined to have originated from malicious code or possibly malicious code.

Computing Environment

To further explain the operations of the GMM module in conjunction with the guest agent to detect malicious modifications made to OS kernel objects, various implementations will now be explained in more detail using FIG. 1, which is a schematic diagram illustrating an example virtualized computing environment 100 that can implement a method to protect OS kernel objects. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be a guest VM that includes a guest operating system (OS) 122 and one or more guest applications 124 (and their corresponding processes) that run on top of the guest OS 122. The guest OS 122 includes a kernel 128 having OS kernel code that uses or operates on OS kernel objects. VM1 118 may also include a guest agent 126. The guest agent 126 of various embodiments may be in the form of a kernel driver. The guest agent 126 may run as part of the guest OS 122. Further details of the features and use of the guest agent 126 will be described later below with respect to FIGS. 2-3. One or more of the guest OS 122, the guest application(s) 124, the guest agent 126, and other code and related data (including data structures) associated with operating VM1 118 may be stored in a guest memory space that is provisioned for VM1 118 and/or in some other storage location in host-A 110A. The guest memory space allocated/provisioned for VM1 118 is graphically represented by a guest memory 138 in FIG. 1.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including the guest memory 138), a virtual disk, a virtual network interface controller (VNIC), etc.

In one embodiment, a guest monitoring mode (GMM) module 140 may reside in a secure memory space that is created for VM1 118 by the hypervisor-A 116A. The secure memory space of VM1 118 (for the GMM module 140) may be a region of memory in a guest memory address space of VM1 118 that is isolated from, and thus inaccessible by, other processes running in the VM1 118 (including privileged processes like the kernel 128 of the guest OS 122). Thus, any code running in the GMM module 140 cannot be compromised via attacks within VM1 118, including attacks that target or otherwise maliciously attempt to modify the guest OS 122.

The GMM module 140 of one embodiment may be a software program or other computer-readable instructions/code, such as a GMM application that is created by a security vendor and loaded by the hypervisor-A 116A into the isolated guest memory address space of VM1 118. The code of the GMM module 140 may be run using guest resources of VM1 118 (e.g., the virtual CPU, the virtual memory, etc. of the virtual hardware 130). As explained above, the guest OS 122 running in VM1 118 does not have visibility into the GMM module 140 (e.g., the guest OS 122 and/or other elements of VM1 118 do not know of the existence of the GMM module 140, or may know of the existence of the GMM module 140 but do not have read/write access rights into the memory space where the GMM module 140 resides). Contrastingly according to one embodiment, the GMM module 140 has read/write access into the state of VM1 118 (e.g., the state of the memory, registers, processes, guest OS 122, applications 124, etc. of VM1 118). In some implementations, the GMM module 140 may be provided with such visibility into the state of VM1 118 via the guest agent 126.

For example, the guest agent 126 that runs in conjunction with the guest OS 122 is aware of the state of the guest OS, memory, registers, processes, applications 124, etc. of VM1 118 and can report this state information to the GMM module 140. Thus, while the GMM module 140 by itself may lack context in some situations as to what is executing in VM1 118, the GMM module 140 can be informed of the state information of VM1 118 via the guest agent 126.

A security program may run on top of or within the hypervisor-A 116A, or may run within or may be installed at other locations within the host-A 110A. The security program may be configured in one embodiment to receive alerts from the GMM module 140 about possible malicious code, and to take a remedial action in response to an alert from the GMM module 140. For example, the security program may take remedial actions such as shutting down VM1 118, disabling the guest OS 122, sending a report to a management server 142 so as to enable a system administrator to further evaluate the alert(s) from the GMM module 140, etc. In some embodiments, the GMM module 140 can be a part (sub-component) of the security program. Furthermore, the security program can be a single discrete program in the host-A 100A or can be a distributed program within the virtualized computing environment 100.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster. The functionality of the management server 142 may be accessed via one or more user devices 146 that are operated by a system administrator. For example, the user device 146 may include a web client 148 (such as a browser-based application) that provides a user interface operable by the system administrator to view and evaluate alerts provided by the GMM module 140 to the management server 142. The system administrator may then operate the user interface of the web client 148 to facilitate the implementation of a remedial action, such as shutting down a VM, disabling a guest OS, debugging, troubleshooting, etc.

The management server 142 may be communicatively coupled to host-A 110A host-N 110N (and hence communicatively coupled to the virtual machines, hypervisors, agents, GMM modules, hardware, etc.) via the physical network 112. The host-A 110A host-N 110N may in turn be configured as a datacenter that is managed by the management server 142. In some embodiments, the functionality of the management server 142 may be implemented in any of host-A 110A host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Monitoring for Malicious Modification of OS Kernel Objects

Figure 2:
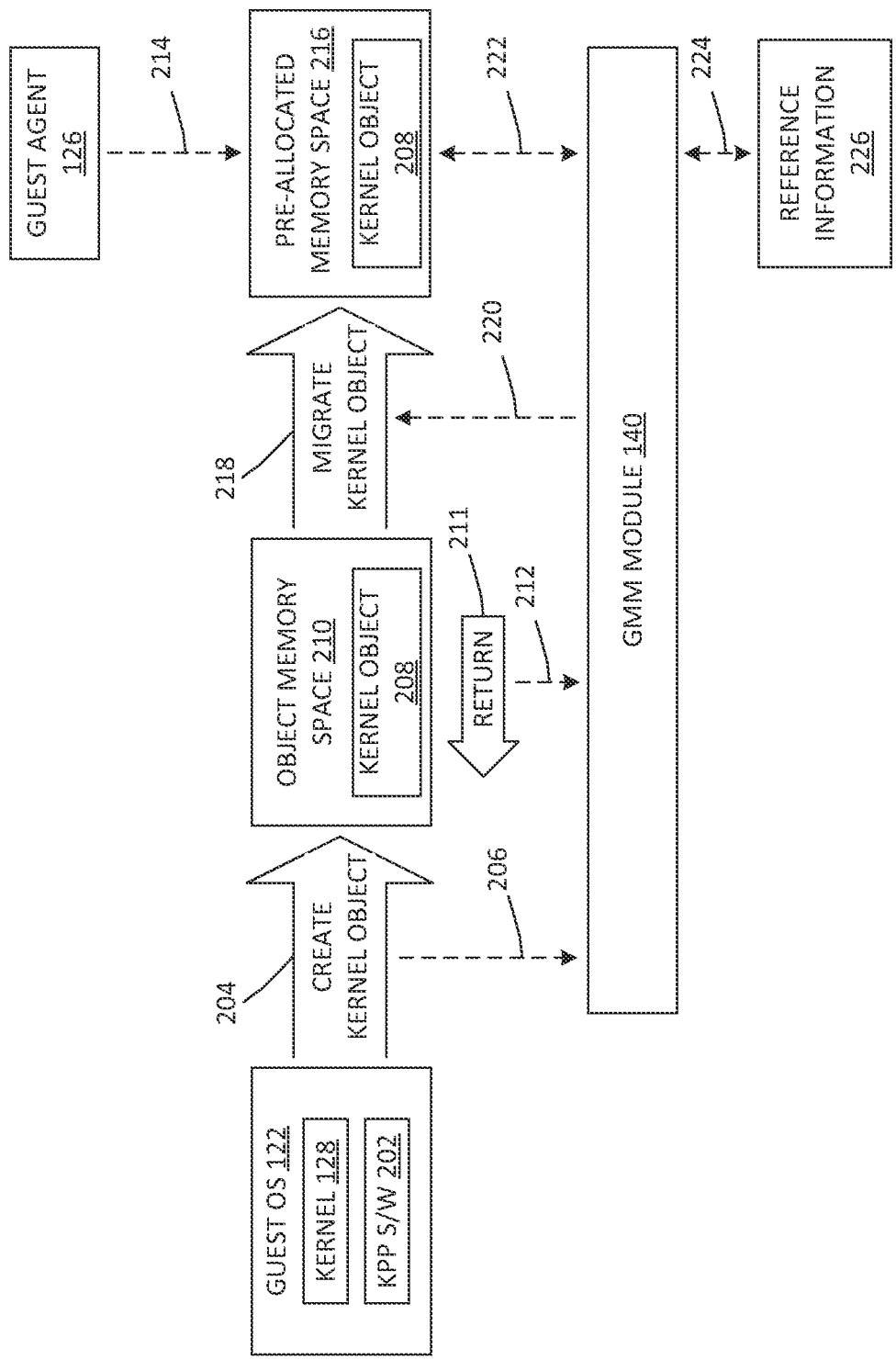
FIG. 2 is a diagram illustrating some of the elements in the virtualized computing environment of FIG. 1 that cooperate to protect OS kernel objects.

FIG. 2 is a diagram 200 illustrating at least some of the elements in the virtualized computing environment 100 of FIG. 1 that cooperate to protect OS kernel objects. Such OS kernel objects may include OS kernel data (including data structures), binary coded decimal (BCD) variables that control the activation/deactivation of signature verification, etc.

The diagram 200 shows the guest OS 122 having the kernel 128. According to some embodiments, the guest OS 122 may be provided with kernel patch protection (KPP) software 202. The KPP software 202 is configured to monitor for (and prevent) modification of the code of the kernel 128. The KPP software 202 can detect modifications to the code of the kernel 128, for example, through periodic checksumming. In view of vulnerabilities of some KPP software 202 to being disabled, some embodiments can use the GMM module 140 to enforce the protection of the code of the kernel 128 more authoritatively, such as by using write traces in the hypervisor. Write traces are described in more detail later below. Also, some KPP software 202 provide protection to the code of the kernel 128 by disallowing write (W) and execute (E) page permissions in a mutually exclusive manner (e.g., a memory page cannot be writable and executable at the same time).

In one embodiment, a transparent code patching technique may be used to insert invisible breakpoints (e.g., invisible markers or triggers) at execution points in the code of the kernel 128. Specifically in an example transparent code patching technique, the GMM module 140 in cooperation with the hypervisor-A 116A can patch or otherwise modify the kernel 128 of the guest OS 122 (in order to insert the invisible breakpoints in the kernel code and to notify the GMM module 140 when these invisible breakpoints are triggered in the execution stream), in the presence of the KPP software 202 that would otherwise prevent the patching of the kernel 128.

With such a technique, the GMM module 140 can patch the kernel 128 in order to enable interception/detection of various events during the execution of the patched code of the kernel 128, while concurrently rendering the patch undetectable by the KPP software 202. This capability may be provided by having the GMM module 140 and the hypervisor-A 116A present the patched code in an execution stream of the guest OS 122, while the original (unpatched) code is presented to the KPP software 202 in a data stream.

Examples of transparent code patching techniques are described in U.S. patent application Ser. No. 15/643,503 (published as U.S. Patent Application Publication No. 2018/0307516), entitled "TRANSPARENT CODE PATCHING USING A HYPERVISOR," filed on Jul. 7, 2017, now U.S. Pat. No. 10,620,985, which is incorporated herein by reference in its entirety.

Thus in the diagram 200 of FIG. 2, the GMM module 140 can place invisible breakpoints associated with executing a function to create OS kernel objects, such that when the function is called for execution, a first breakpoint is triggered to notify the GMM module 140 that the guest OS 122 is attempting to create an OS kernel object. An example function (shown at 204) that is called and executed by the guest OS 122 to create an OS kernel object is ObCreateObject. The detection by the GMM module 140 of the triggering of the first breakpoint (associated with calling the ObCreateObject function to create the OS kernel object) is represented by a broken arrow 206 in FIG. 2. Thereafter, the GMM module 140 places a second breakpoint in the kernel code, such that when the ObCreateObject function returns (after creating the OS kernel object), the GMM module 140 is notified of the triggering of the second breakpoint (thereby informing the GMM module 140 of the completion of the creation of the OS kernel object).

The OS kernel object (shown at 208) is created and initially/originally stored at one or more memory addresses of an object memory space 210 (e.g., a first memory space). The object memory space 210 can reside in the guest memory 138 (shown in FIG. 1) of the VM1 118 or in some other memory in the host-A 110A. The return of the ObCreateObject function (after the creation of the OK kernel object) is shown at 211, and the notification to the GMM module 140 of the triggering of the corresponding second invisible breakpoint associated with the return 211 is shown at 212.

According to one embodiment, the guest agent 126 pre-allocates (shown at 214) one or more memory addresses to which the created OS kernel object 208 will be migrated to. For example, these memory addresses may form a set of memory addresses in a pool of memory addresses in a pre-allocated memory space 216 (e.g., a second memory space different from the object memory space 210) that resides in the guest memory 138 (shown in FIG. 1) of the VM1 118 or in some other storage area in the host-A 110A. The pre-allocated memory space 216 may be mapped to a memory address space of the GMM module 140 in some embodiments.

According to one embodiment, a write trace may be implemented by having the GMM module 140 mark the memory address(es) (where an OS kernel object resides) as read-only, such as by marking the memory address(es) in a page as read-only in extended page tables that are under control by the hypervisor-A 116A and not the guest VM1 118, such that any write operation attempted by an entity (other than the GMM module 140) on the memory address (es) triggers a fault that is reported to or otherwise detected by the GMM module 140. The GMM module 140 can then trace the source of the write attempt to determine whether the write attempt should be allowed or not allowed. Examples of write trace techniques are described in U.S. patent application Ser. No. 15/616,935 (published as U.S. Patent Application Publication No. 2018/0267818), entitled "HYPERVISOR-ASSISTED APPROACH FOR LOCATING OPERATING SYSTEM DATA STRUCTURES BASED ON NOTIFICATION DATA," filed on Jun. 8, 2017, which is incorporated herein by reference in its entirety. It is noted that modifications made by the GMM module 140 to the OS kernel objects stored in the pre-allocated memory space 216 do not trigger a write trace, since the GMM module 140 is provided with read/write access privileges to the pre-allocated memory space 216.

Therefore in operation and in response to the triggering of the second invisible breakpoint (shown at 212) by the return 211 to indicate the completion of the creation of the OS kernel object 208, the GMM module 140 migrates (shown at 218 and 220) the OS kernel object 208 from the object memory space 210 to one or more memory addresses in the pool of memory addresses in the pre-allocated memory space 216. Once the OS kernel object 208 is migrated to the pre-allocated memory space 216 having write traces configured therein, the GMM module 140 is able to monitor (shown at 222) for modification attempts directed at the OS kernel object 208. At this point, the GMM module 140 can make the guest VM1 118 free the object memory space 210 where the OS kernel object 128 was allocated to begin with. Otherwise, this object memory space 210 may be leaked.

If a fault is subsequently triggered (which indicates to the GMM module 140 that an attempt (e.g., a first attempt) has been made to modify the OS kernel object 208 in the pre-allocated memory space 216), then the GMM module 140 checks (shown at 224) reference information 226 to determine the legitimacy of the modification. According to one embodiment, the reference information 226 can comprise the memory address range of the code region for the kernel 128, such that the GMM module 140 can check the virtual return instruction pointer (VRIP) associated with the attempt to modify the OS kernel object 208, so as to ensure that the VRIP points to or returns to the range of the code region for the kernel 128. A VRIP that points to or returns to a code region outside of this range can be deemed by the GMM module 140 to be potentially malicious.

In another embodiment, the reference information 226 can be in the form of a list of memory addresses (including relative addresses and address offsets, such as absolute addresses that are determinable through address offsets that are added to the base address where the kernel 128 is loaded) that is maintained by the GMM module 140, wherein the memory addresses in the list are the memory addresses of code that are permitted to modify the particular OS kernel object 208. Modification attempts on the OS kernel object 208 by code residing in memory addresses outside of the list can be deemed by the GMM module 140 to be potentially malicious. Also, the GMM module 140 can modify the list of memory addresses, in response to changes in the relative addressing whenever the kernel 128 is updated, thereby keeping the memory addresses in the list up to date.

In still another embodiment, the kernel 128 can be placed in a learning mode, so as to generate a list, over time during the learning mode, of relative addresses that modify a particular OS kernel object. The list generated from this learning mode can then be later used by the GMM module 140 for the reference information 226 to check the legitimacy of attempts to modify OS kernel objects in the pre-allocated memory space 216.

Figure 3:
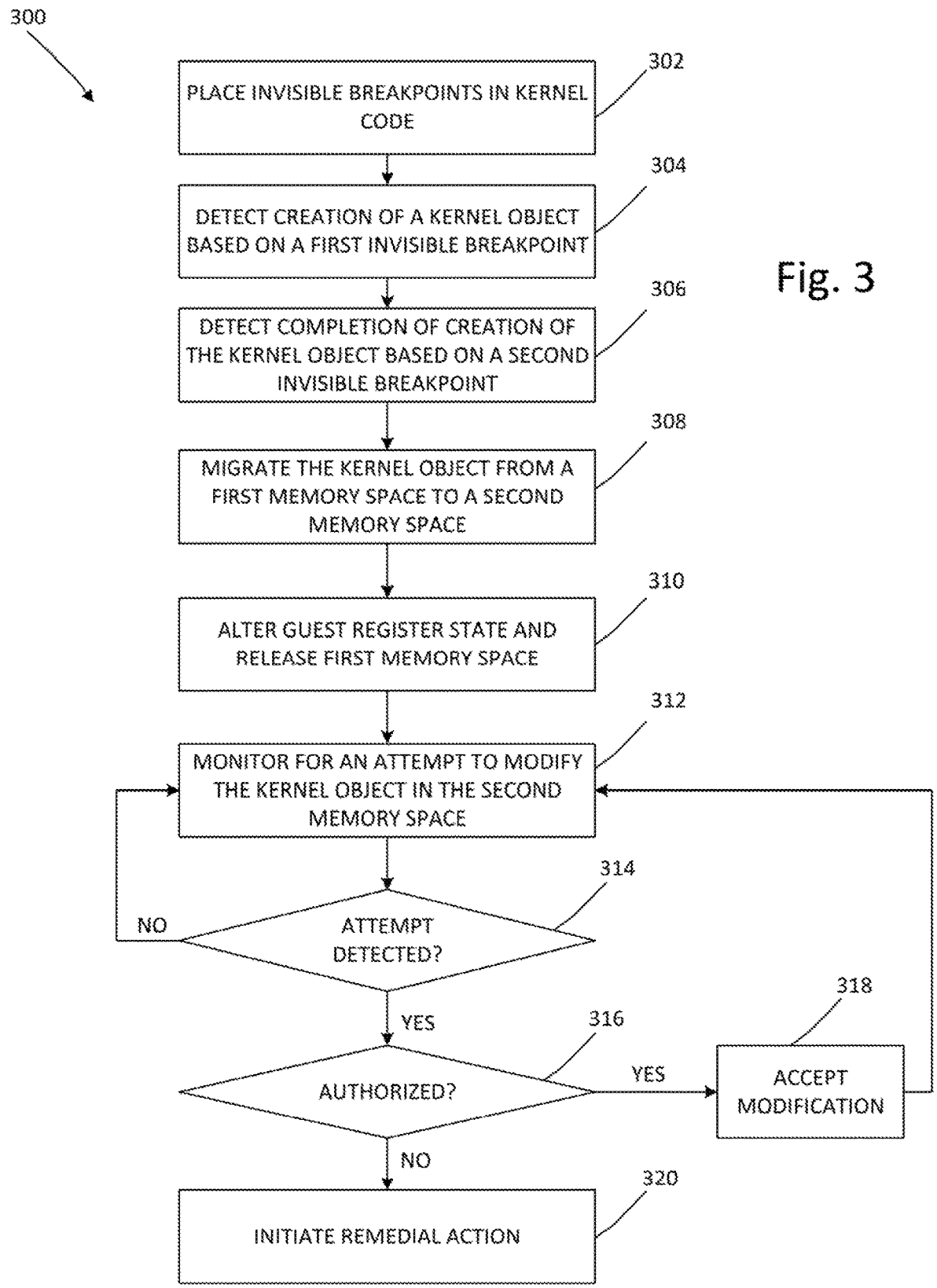
FIG. 3 is a flowchart of an example method to protect OS kernel objects in the virtualized computing environment of FIG. 1.

Further details of the monitoring for malicious modification of OS kernel objects will now be provided with respect to FIG. 3. Specifically, FIG. 3 is a flowchart of an example method 300 to protect OS kernel objects in the virtualized computing environment 100 of FIG. 1.

Example method 300 may include one or more operations, functions, or actions illustrated by one or more blocks, such as blocks 302 to 320. The various blocks of the method 300 and/or of any other process(es) described herein may be combined into fewer blocks, divided into additional blocks, supplemented with further blocks, and/or eliminated based upon the desired implementation. In one embodiment, the operations of the method 300 and/or of any other process(es) described herein may be performed in a pipelined sequential manner. In other embodiments, some operations may be performed out-of-order, in parallel, etc.

According to one embodiment, the method 300 may be performed by the GMM module 140 in cooperation with the guest agent 126 and the management server 142. For example, the GMM module 140 may be a sub-component of a security program controlled by the management server 142, and the security program may in turn control or operate the guest agent 126 and the GMM module 140.

At a block 302 ("PLACE INVISIBLE BREAKPOINTS IN KERNEL CODE"), the GMM module 140 places invisible breakpoints in the kernel code of the kernel 128. For instance, the GMM module 140 places a first invisible breakpoint in the kernel code that is triggered when the ObCreateObject function is called to create the OS kernel object 208.

The block 302 may be followed by a block 304 ("DETECT CREATION OF A KERNEL OBJECT BASED ON A FIRST INVISIBLE BREAKPOINT"), wherein the kernel 128 calls the ObCreateObject function (e.g., a first function) to create the OS kernel object 208. As a result, the first invisible breakpoint is triggered and detected by the GMM module 140. The GMM module 140 then places a second invisible breakpoint in the kernel code, such that the GMM module 140 will be notified of the completion of the creation of the OS kernel object 208 when the ObCreateObject function returns.

The block 304 may be followed by a block 306 ("DETECT COMPLETION OF CREATION OF THE KERNEL OBJECT BASED ON A SECOND INVISIBLE BREAKPOINT"), wherein the ObCreateObject function returns and the second breakpoint is thus triggered to notify the GMM module of the completion of the creation of the OS kernel object 208. Accordingly at a block 308 ("MIGRATE THE KERNEL OBJECT FROM A FIRST MEMORY SPACE TO A SECOND MEMORY SPACE") that follows the block 306, the GMM module 140 migrates the OS kernel object 208 from the object memory space 210 (where the OS kernel object was originally created/stored) to one or more addresses in a pool of addresses in the pre-allocated memory space 216.

The block 308 may be followed by a block 310 ("ALTER GUEST REGISTER STATE AND RELEASE FIRST MEMORY SPACE") in which the GMM module 140 alters the guest memory state (or other state information) of the guest OS 122, so as to indicate to the kernel 128 that the OS kernel object 208 was allocated from (created in) the memory address(es) in the pre-allocated memory space 216. This operation at the block 310 serves at least one purpose: the kernel 128 (and malicious code, if present) is forced to operate on/with the OS kernel object 208 in the pre-allocated memory space 216 that has been configured with write traces (and therefore malicious modification attempts are traceable), as opposed to operating on/with the OS kernel object 208 in the original object memory space 210 that is not configured with write traces (and therefore modification attempts on the object memory space 210 would have been untraceable). Moreover at the block 310, the GMM module 140 instructs the guest OS 122 to release the memory address(es) in the object memory space 210 where the OS kernel object 208 originally resided, thereby freeing up these memory address(es) for use by other OS kernel objects that are to be created by the kernel 128.

At a block 312 ("MONITOR FOR AN ATTEMPT TO MODIFY THE KERNEL OBJECT IN THE SECOND MEMORY SPACE"), the GMM module 140 monitors for attempts to modify the OS kernel object 208 that has been migrated to the pre-allocated memory space 216. As previously explained above, an attempt to modify the OS kernel object 208 triggers a write trace that notifies the GMM module 140 of the attempt to modify (e.g., a "YES" at a block 314 ("ATTEMPT DETECTED?")). Otherwise if there is a "NO" at the block 314, the GMM module 140 continues monitoring at the block 312.

If the attempt ("YES") is detected at the block 314, then the GMM module 140 determines whether the attempt is legitimate/authorized at a block 316 ("AUTHORIZED?"). For instance and as explained above, the GMM module 140 can check the reference information 226 to determine whether the entity/code that attempted to modify the OS kernel object 208 has originated from memory addresses corresponding to trusted kernel code. If the GMM module 140 determines that the modification attempt is authorized ("YES" at the block 316), then the GMM module 140 allows or accepts the modification at a block 318 ("ACCEPT MODIFICATION"), and the process returns to the block 312 where the GMM module 140 continues to monitor for other attempts to modify OS kernel object(s) in the pre-allocated memory space 216.

If the GMM module 140 determines that the attempt is not authorized ("NO" at the block 316), then the GMM module 140 initiates a remedial action at a block 320 ("INITIATE REMEDIAL ACTION"). An unauthorized attempt could include, for example, an attempt to alter a process token object to grant access to a malicious user, an attempt to alter a function pointer to point to a ROP chain, an attempt to use a write-anything-anywhere primitive to deactivate signature verification controlled by a BCD variable, etc. The remedial action initiated at the block 320 to address or otherwise respond to the unauthorized modification attempt can include one or more of: shutting down the guest OS 122 or the VM1 118, sending an alert to the management server 142 to enable a system administrator to further investigate the modification, etc.

The OS kernel object 208 may be subsequently destroyed. In a destruction scenario, the kernel 128 calls a destroy function that attempts to delete the OS kernel object 208 from the pre-allocated memory space 216 when the OS kernel object 208 is no longer needed, thereby freeing up memory addresses for use by other OS kernel objects. In one embodiment, the GMM module 140 monitors for destruction attempts that are directed towards OS kernel objects.

Figure 4:
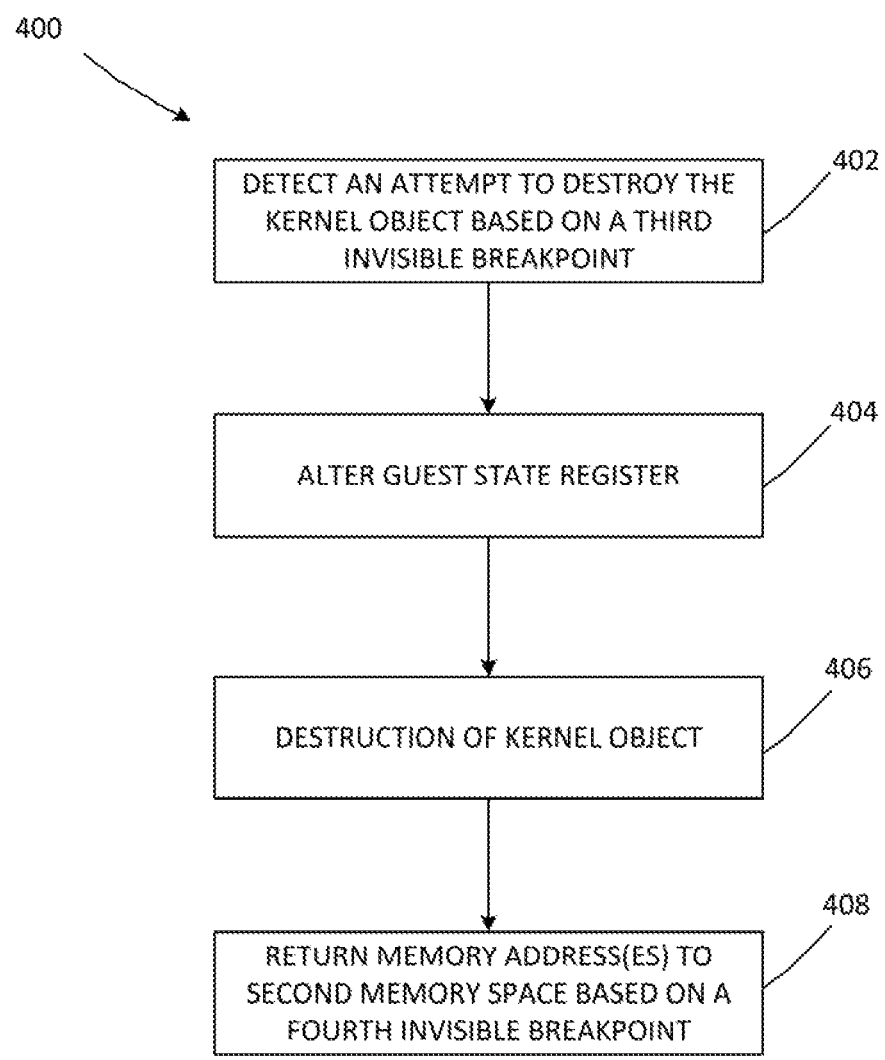
FIG. 4 is a flowchart of an example method to destroy OS kernel objects in the virtualized computing environment of FIG. 1.

Specifically, FIG. 4 is a flowchart of an example method 400 to destroy OS kernel objects in the virtualized computing environment 100 of FIG. 1. As with the ObCreateObject function described above to create an OS kernel object, the GMM module 140 places a third invisible breakpoint in the kernel code, such that the third invisible breakpoint is triggered when a destroy function is called by the kernel 128 to delete an OS kernel object (e.g., the OS kernel object 208) from the pre-allocated memory space 216.

At a block 402 ("DETECT AN ATTEMPT TO DESTROY THE KERNEL OBJECT BASED ON A THIRD INVISIBLE BREAKPOINT"), the GMM module 140 detects/intercepts the attempt to destroy the OS kernel object 208 when the destroy function is called (due to the third invisible breakpoint being triggered when the destroy function is called). The block 402 is followed by the block 404 ("ALTER GUEST STATE REGISTER"), wherein in response to intercepting the destroy function, the GMM module 140 alters the guest state register or other kernel code or state information of the guest OS 122, so as to insert a fourth invisible breakpoint that triggers when the destroy function returns. The GMM module 140 then awaits for the destroy function to finish deletion of the OS kernel object 208 in the pre-allocated memory space 216, at a block 406 ("DESTRUCTION OF KERNEL OBJECT"). When the destroy function returns (after deletion of the OS kernel object), the fourth invisible breakpoint is triggered to notify the GMM module 140 that the OS kernel object 208 has been deleted from the pre-allocated memory space 216. Thereafter at a block 408 ("RETURN MEMORY ADDRESS(ES) TO SECOND MEMORY SPACE BASED ON A FOURTH INVISIBLE BREAKPOINT") and in response to the triggering of the fourth invisible breakpoint, the GMM module 140 returns the set of memory address (es), previously occupied by the OS kernel object 208, back to the pool of addresses in the pre-allocated memory space 216, thereby freeing up memory for use by other OS kernel objects that are to be migrated into the pre-allocated memory space 216.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 2-4. For example, computing devices capable of acting as host devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to virtual machines, it should be understood that a virtual machine running within a host is merely one example of a virtualized computing instance or workload. A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to protect OS kernel objects from malicious code.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A computer-readable storage medium, as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method in a virtualized computing environment to protect operating system (OS) kernel objects against modification by malicious code, the method comprising:
   allocating, by a guest agent in a guest virtualized computing instance supported by a host in the virtualized computing environment, a memory space to store the OS kernel objects;
   detecting, by a guest monitoring mode (GMM) module at the host, creation of an OS kernel object by a guest OS of the virtualized computing instance;
   in response to detecting the creation of the OS kernel object, migrating, by the GMM module, the created OS kernel object to one or more memory addresses of the allocated memory space;
   monitoring, by the GMM module, for at least one attempt to modify the OS kernel object in the one or more memory addresses of the allocated memory space;
   in response to the monitoring having detected a first attempt to modify the OS kernel object, checking, by the GMM module, reference information to determine whether the first attempt is authorized; and
   in response to a determination that the first attempt is unauthorized, initiating, by the GMM module, a remedial action to respond to the first attempt.

2. The method of claim 1, wherein the GMM module resides in a hypervisor of the host.

3. The method of claim 1, wherein:
   detecting the creation of the OS kernel object includes detecting, by the GMM module, a call by the guest OS to a first function to create the OS kernel object, and a return of the first function to indicate completion of the creation of the OS kernel object,
   the OS kernel object is created by the first function in a first memory space in which attempts to modify the OS kernel object are untraceable by the GMM module,
   the allocated memory space includes a second memory space in which attempts to modify the OS kernel object are traceable by the GMM module, and
   migrating the created OS kernel object includes migrating, by the GMM module, the created OS kernel object from the first memory space to the second memory space.

4. The method of claim 3, further comprising:
   modifying, by the GMM module, state information of the guest OS to indicate to the guest OS that the OS kernel object was originally created in the second memory space; and
   releasing, by the GMM module, at least one memory address in the first memory space that was occupied by the OS kernel object.

5. The method of claim 1, wherein the one or more memory addresses of the allocated memory space includes a set of memory addresses in a pool of memory addresses of the allocated memory space, and wherein the method further comprises:
   in response to the monitoring having detected a second attempt to destroy the OS kernel object in the allocated memory space:
      awaiting, by the GMM module, a notification that the OS kernel object has been deleted from the set of memory addresses; and
      returning, by the GMM module after deletion of the OS kernel object from the set of memory addresses, the set of memory addresses to the pool of memory addresses in the allocated memory space.

6. The method of claim 1, further comprising in response to a determination that the first attempt is authorized, accepting, by the GMM module, modification of the OS kernel object.

7. The method of claim 1, wherein the remedial action includes one or more of: shutting down the guest OS, shutting down the virtualized computing instance, or sending an alert to a management server to enable further investigation of the first attempt.

8. A non-transitory computer-readable medium having instructions stored thereon, which in response to execution by one or more processors in a virtualized computing environment, cause the one or more processors to perform or control performance of operations to protect operating system (OS) kernel objects against modification by malicious code, the operations comprising:
   allocating, by a guest agent in a guest virtualized computing instance supported by a host in the virtualized computing environment, a memory space to store the OS kernel objects;

detecting, by a guest monitoring mode (GMM) module at the host, creation of an OS kernel object by a guest OS of the virtualized computing instance;

in response to detecting the creation of the OS kernel object, migrating, by the GMM module, the created OS kernel object to one or more memory addresses of the allocated memory space;

monitoring, by the GMM module, for at least one attempt to modify the OS kernel object in the one or more memory addresses of the allocated memory space;

in response to the monitoring having detected a first attempt to modify the OS kernel object, checking, by the GMM module, reference information to determine whether the first attempt is authorized; and in response to a determination that the first attempt is unauthorized, initiating, by the GMM module, a remedial action to respond to the first attempt.

9. The non-transitory computer-readable medium of claim 8, wherein the GMM module resides in a hypervisor of the host.

10. The non-transitory computer-readable medium of claim 8, wherein:

detecting the creation of the OS kernel object includes detecting, by the GMM module, a call by the guest OS to a first function to create the OS kernel object, and a return of the first function to indicate completion of the creation of the OS kernel object, the OS kernel object is created by the first function in a first memory space in which attempts to modify the OS kernel object are untraceable by the GMM module, the allocated memory space includes a second memory space in which attempts to modify the OS kernel object are traceable by the GMM module, and migrating the created OS kernel object includes migrating, by the GMM module, the created OS kernel object from the first memory space to the second memory space.

11. The non-transitory computer-readable medium of claim 10, wherein the operations further comprise:

modifying, by the GMM module, state information of the guest OS to indicate to the guest OS that the OS kernel object was originally created in the second memory space; and releasing, by the GMM module, at least one memory address in the first memory space that was occupied by the OS kernel object.

12. The non-transitory computer-readable medium of claim 8, wherein the one or more memory addresses of the allocated memory space includes a set of memory addresses in a pool of memory addresses of the allocated memory space, and wherein the operations further comprise:

in response to the monitoring having detected a second attempt to destroy the OS kernel object in the allocated memory space:

awaiting, by the GMM module, a notification that the OS kernel object has been deleted from the set of memory addresses; and returning, by the GMM module after deletion of the OS kernel object from the set of memory addresses, the set of memory addresses to the pool of memory addresses in the allocated memory space.

13. The non-transitory computer-readable medium of claim 8, wherein the operations further comprise:

in response to a determination that the first attempt is authorized, accepting, by the GMM module, modification of the OS kernel object.

14. The non-transitory computer-readable medium of claim 8, wherein the remedial action includes one or more of: shutting down the guest OS, shutting down the virtualized computing instance, or sending an alert to a management server to enable further investigation of the first attempt.

15. A host in a virtualized computing environment, the host comprising:

a processor; and a non-transitory computer-readable medium coupled to the processor and having stored instructions stored thereon, which in response to execution by the processor, provide a guest monitoring mode (GMM) module and a guest agent in a guest virtualized computing instance supported by the host, wherein the instructions, further in response to execution by the processor, cause the processor to perform or control performance of operations to protect operating system (OS) kernel objects against modification by malicious code, and wherein the operations include:

allocate, by the guest agent, a memory space to store the OS kernel objects;

detect, by the GMM module, creation of an OS kernel object by a guest OS of the virtualized computing instance;

in response to detection of the creation of the OS kernel object, migrate, by the GMM module, the created OS kernel object to one or more memory addresses of the allocated memory space;

monitor, by the GMM module, for at least one attempt to modify the OS kernel object in the one or more memory addresses of the allocated memory space;

in response to having detected a first attempt to modify the OS kernel object, check, by the GMM module, reference information to determine whether the first attempt is authorized; and in response to a determination that the first attempt is unauthorized, initiate, by the GMM module, a remedial action to respond to the first attempt.

16. The host of claim 15, wherein the GMM module resides in a hypervisor of the host.

17. The host of claim 15, wherein:

detection of the creation of the OS kernel object includes detection, by the GMM module, of a call by the guest OS to a first function to create the OS kernel object, and of a return of the first function to indicate completion of the creation of the OS kernel object, the OS kernel object is created by the first function in a first memory space in which attempts to modify the OS kernel object are untraceable by the GMM module, the allocated memory space includes a second memory space in which attempts to modify the OS kernel object are traceable by the GMM module, and migration of the created OS kernel object includes migration, by the GMM module, of the created OS kernel object from the first memory space to the second memory space.

18. The host of claim 17, wherein the operations further comprise:

modify, by the GMM module, state information of the guest OS to indicate to the guest OS that the OS kernel object was originally created in the second memory space; and release, by the GMM module, at least one memory address in the first memory space that was occupied by the OS kernel object.

19. The host of claim 15, wherein the one or more memory addresses of the allocated memory space includes a set of memory addresses in a pool of memory addresses of the allocated memory space, and wherein the operations further comprise:
   in response to having detected a second attempt to destroy the OS kernel object in the allocated memory space:
      awaiting, by the GMM module, a notification that the OS kernel object has been deleted from the set of memory addresses; and
      return, by the GMM module after deletion of the OS kernel object from the set of memory addresses, the set of memory addresses to the pool of memory addresses in the allocated memory space.

20. The host of claim 15, wherein the operations further comprise:
   in response to a determination that the first attempt is authorized, accept, by the GMM module, modification of the OS kernel object.

21. The host of claim 15, wherein the remedial action includes one or more of: shutting down the guest OS, shutting down the virtualized computing instance, or sending an alert to a management server to enable further investigation of the first attempt.

* * * * *